United States Patent
Ji et al.

(10) Patent No.: US 11,742,993 B2
(45) Date of Patent: Aug. 29, 2023

(54) COLLISION INDICATION FOR SIDELINK GROUPCAST WITH HARQ OPTION 2

(71) Applicant: Nokia Technologies Oy, Espoo (FI)

(72) Inventors: Lianghai Ji, Aalborg (DK); Prajwal Keshavamurthy, Munich (DE); Vinh Van Phan, Oulu (FI); Ling Yu, Kauniainen (FI); Nuno Manuel Kiilerich Pratas, Gistrup (DK); Daniel Medina, Munich (DE); Torsten Wildschek, Gloucester (GB)

(73) Assignee: Nokia Technologies Oy, Espoo (FI)

( * ) Notice: Subject to any disclaimer, the term of this patent is extended or adjusted under 35 U.S.C. 154(b) by 157 days.

(21) Appl. No.: 17/315,976

(22) Filed: May 10, 2021

(65) Prior Publication Data
US 2022/0360371 A1  Nov. 10, 2022

(51) Int. Cl.
| | |
|---|---|
| H04L 1/1812 | (2023.01) |
| H04L 1/1867 | (2023.01) |
| H04W 76/11 | (2018.01) |
| H04L 1/1829 | (2023.01) |
| H04W 92/18 | (2009.01) |

(52) U.S. Cl.
CPC .......... H04L 1/1819 (2013.01); H04L 1/1812 (2013.01); H04L 1/1854 (2013.01); H04L 1/1896 (2013.01); H04W 76/11 (2018.02); H04W 92/18 (2013.01)

(58) Field of Classification Search
None
See application file for complete search history.

(56) References Cited

U.S. PATENT DOCUMENTS

| | | | |
|---|---|---|---|
| 2007/0157263 A1* | 7/2007 | Horii | H04N 21/42684 |
| | | | 725/86 |
| 2020/0296142 A1* | 9/2020 | Wang | H04W 12/06 |
| 2021/0050950 A1* | 2/2021 | Zhou | H04W 72/0413 |
| 2021/0099261 A1* | 4/2021 | Baghel | H04W 72/51 |
| 2021/0360484 A1* | 11/2021 | Sarkis | H04W 28/26 |
| 2021/0410126 A1* | 12/2021 | Ganesan | H04L 1/1861 |
| 2022/0030603 A1* | 1/2022 | Sarkis | H04L 1/1896 |
| 2022/0201654 A1* | 6/2022 | Lee | H04W 72/0406 |
| 2022/0225160 A1* | 7/2022 | Sarkis | H04W 28/26 |
| 2022/0278797 A1* | 9/2022 | Lee | H04W 64/00 |
| 2022/0303954 A1* | 9/2022 | Hwang | H04L 5/006 |

(Continued)

FOREIGN PATENT DOCUMENTS

| | | | |
|---|---|---|---|
| WO | WO2020222568 | * | 1/2022 |
| WO | WO2022151442 | * | 1/2022 |

OTHER PUBLICATIONS

Sarkis. U.S. Appl. No. 62/706,022. (Year: 2020).*

(Continued)

*Primary Examiner* — Andre Tacdiran
(74) *Attorney, Agent, or Firm* — Harrington & Smith

(57) ABSTRACT

An SL UE that detects a resource conflict associated with a transmitting UE may be able to indicate this resource conflict by transmitting inter-UE coordination information over a PSFCH resource determined based on a group member ID of the transmitting UE. This may be different from transmitting HARQ feedback via a PSFCH resource determined based on a group member ID of the detecting UE.

20 Claims, 5 Drawing Sheets

(56) References Cited

U.S. PATENT DOCUMENTS

2022/0393819 A1* 12/2022 Lee .................. H04L 5/0048

OTHER PUBLICATIONS

Sarkis. U.S. Appl. No. 63/023,508. (Year: 2020).*
3$^{rd}$ Generation Partnership Project: Technical Specification Group Radio Access Network; "Study on Evaluation : Methodology of New Vehicle-to-Everything (V2X) Use Cases for LTE and NR" (Release 15) 3GPP TR 37.885 V15.3.0 (Jun. 2019).
Moderator (LG Electronics) "Feature Lead Summary for AI 8.11.1.2 Inter-UE Coordination for Mode 2 Enhancements?" 3GPP TSG RAN WG1 #104bis-e R1-2104103 E-Meeting, Apr. 12-20, 2021.
5G; NR; "Physical Layer Procedures for Control" (3GPP TS 38.213 version 16.2.0 Release 16) ETSI TS 138 213 V.16.2.0 (Jul. 2020).
5G; Nr; "Medium Access Control (MAC) Protocol Specification" (3GPP Ts 38.321 version 16.1.0 Release 16) Etsi Ts 13 8 321 VI6.1.0 (2020-07).

* cited by examiner

400

```
┌─────────────────────────────┐
│ Determine a group member    │
│ identifier of at least one  │  410
│ user equipment that has     │
│ performed transmission      │
└─────────────────────────────┘
              ▼
┌─────────────────────────────┐
│ Determine at least one      │
│ physical sidelink feedback  │
│ channel resource based, at  │  420
│ least partially, on the     │
│ determined group member     │
│ identifier                  │
└─────────────────────────────┘
              ▼
┌─────────────────────────────┐
│ Transmit, with the at least │
│ one determined physical     │
│ sidelink feedback channel   │
│ resource to the at least    │
│ one user equipment that has │  430
│ performed transmission, an  │
│ indication of a resource    │
│ conflict associated with    │
│ the at least one user       │
│ equipment                   │
└─────────────────────────────┘
```

FIG. 4

COLLISION INDICATION FOR SIDELINK GROUPCAST WITH HARQ OPTION 2

BACKGROUND

Technical Field

The example and non-limiting embodiments relate generally to sidelink communication and, more particularly, to notification of a resource conflict between sidelink UE.

Brief Description of Prior Developments

It is known, in sidelink communication, to use a SL HARQ resource to indicate a resource conflict.

SUMMARY

The following summary is merely intended to be exemplary. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to perform: determine a group member identifier of at least one user equipment that has performed transmission; determine at least one physical sidelink feedback channel resource based, at least partially, on the determined group member identifier; and transmit, with the at least one determined physical sidelink feedback channel resource to the at least one user equipment that has performed transmission, an indication of a resource conflict associated with the at least one user equipment.

In accordance with one aspect, a method comprising: determining a group member identifier of at least one user equipment that has performed transmission; determining at least one physical sidelink feedback channel resource based, at least partially, on the determined group member identifier; and transmitting, with the at least one determined physical sidelink feedback channel resource to the at least one user equipment that has performed transmission, an indication of a resource conflict associated with the at least one user equipment.

In accordance with one aspect, an apparatus comprising means for performing: determining a group member identifier of at least one user equipment that has performed transmission; determining at least one physical sidelink feedback channel resource based, at least partially, on the determined group member identifier; and transmitting, with the at least one determined physical sidelink feedback channel resource to the at least one user equipment that has performed transmission, an indication of a resource conflict associated with the at least one user equipment.

In accordance with one aspect, a non-transitory computer-readable medium comprising program instructions stored thereon which, when executed with at least one processor, cause the at least one processor to: determine a group member identifier of at least one user equipment that has performed transmission; determine at least one physical sidelink feedback channel resource based, at least partially, on the determined group member identifier; and transmit, with the at least one determined physical sidelink feedback channel resource to the at least one user equipment that has performed transmission, an indication of a resource conflict associated with the at least one user equipment.

In accordance with one aspect, an apparatus comprising: at least one processor; and at least one memory including computer program code; the at least one memory and the computer program code configured to, with the at least one processor, cause the apparatus at least to perform: perform transmission of at least one message; determine at least one physical sidelink feedback channel resource based, at least partially, on a group member identifier of the apparatus; monitor the at least one determined physical sidelink feedback channel resource; and receive, based on monitoring of the at least one determined physical sidelink feedback channel resource, an indication of a resource conflict associated with the at least one message.

In accordance with one aspect, a method comprising: performing, with an apparatus, transmission of at least one message; determining at least one physical sidelink feedback channel resource based, at least partially, on a group member identifier of the apparatus; monitoring the at least one determined physical sidelink feedback channel resource; and receiving, based on monitoring of the at least one determined physical sidelink feedback channel resource, an indication of a resource conflict associated with the at least one message.

In accordance with one aspect, an apparatus comprising means for performing: performing transmission of at least one message; determining at least one physical sidelink feedback channel resource based, at least partially, on a group member identifier of the apparatus; monitoring the at least one determined physical sidelink feedback channel resource; and receiving, based on monitoring of the at least one determined physical sidelink feedback channel resource, an indication of a resource conflict associated with the at least one message.

In accordance with one aspect, a non-transitory computer-readable medium comprising program instructions stored thereon which, when executed with at least one processor, cause the at least one processor to: perform, with an apparatus, transmission of at least one message; determine at least one physical sidelink feedback channel resource based, at least partially, on a group member identifier of the apparatus; monitor the at least one determined physical sidelink feedback channel resource; and receive, based on monitoring of the at least one determined physical sidelink feedback channel resource, an indication of a resource conflict associated with the at least one message.

In accordance with one aspect, an apparatus comprising means for performing a method according an example embodiment of the present disclosure.

In accordance with one aspect, a non-transitory computer-readable medium comprising program instruction stored thereon for performing a process including a method according to an example embodiment of the present disclosure.

In accordance with one aspect, a computer program comprising instructions stored thereon for performing at least the following: determining a group member identifier of at least one user equipment that has performed transmission; determining at least one physical sidelink feedback channel resource based, at least partially, on the determined group member identifier; and transmitting, with the at least one determined physical sidelink feedback channel resource to the at least one user equipment that has performed transmission, an indication of a resource conflict associated with the at least one user equipment.

In accordance with one aspect, a computer program comprising instructions stored thereon for performing at least the following: performing, with an apparatus, transmission of at least one message; determining at least one physical sidelink feedback channel resource based, at least partially, on a group member identifier of the apparatus; monitoring the at least one determined physical sidelink feedback channel resource; and receiving, based on monitoring of the at least one determined physical sidelink feedback channel resource, an indication of a resource conflict associated with the at least one message.

BRIEF DESCRIPTION OF THE DRAWINGS

The foregoing aspects and other features are explained in the following description, taken in connection with the accompanying drawings, wherein:

FIG. 4 is a flowchart illustrating steps as described herein; and

DETAILED DESCRIPTION OF EMBODIMENTS

Figure 1:
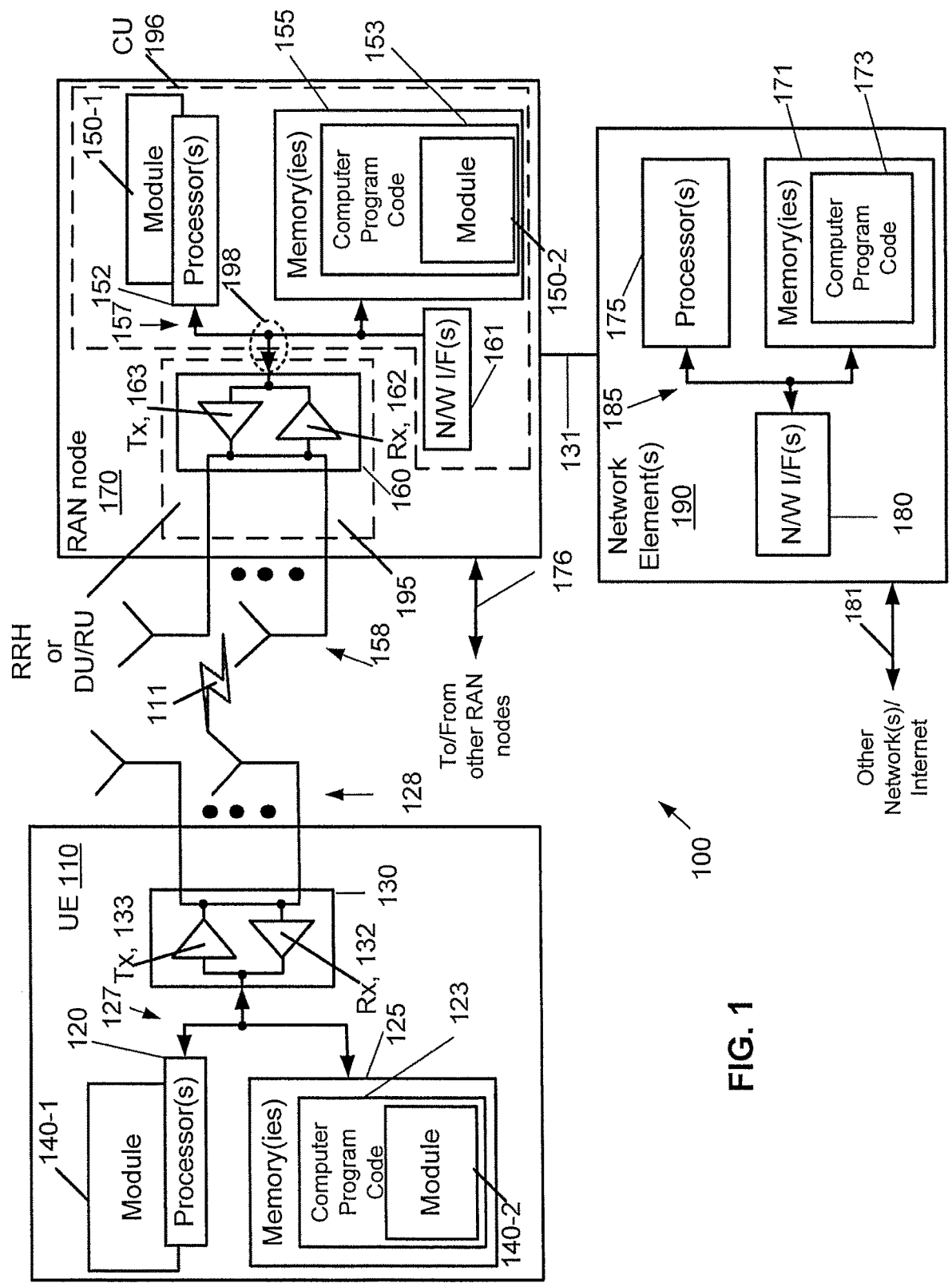
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
5G fifth generation
5GC 5G core network
ACK acknowledgement
AMF access and mobility management function
AS access stratum
CBR channel busy ratio
CE control element
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HARQ hybrid automatic repeat request
I/F interface
ID identifier
L1 layer 1
LTE long term evolution
MAC medium access control
MME mobility management entity
NACK negative acknowledgement
ng or NG new generation
ng-eNB or NG-eNB new generation eNB
NR new radio
N/W or NW network
PDCP packet data convergence protocol
PHY physical layer
PRB physical resource block
PSCCH physical sidelink control channel
PSFCH physical sidelink feedback channel
PSSCH physical sidelink shared channel
RAN radio access network
Re-TX retransmission
RF radio frequency
RLC radio link control
RRH remote radio head
RRC radio resource control
RS reference signal
RU radio unit
Rx receiver
SCI sidelink control information
SL sidelink
SDAP service data adaptation protocol
SGW serving gateway
SMF session management function
TB transport block
Tx transmitter/transmission
UE user equipment (e.g., a wireless, typically mobile device)
UL uplink
UPF user plane function
V2X vehicle-to-anything Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

Although not illustrated in FIG. 1, the UE 110 may also communicate with other UEs via short range communication technologies, such as Bluetooth®. If wireless communication with a network is unavailable or not possible, or in addition to network communication, the UE 110 may be capable of sidelink communication with other UEs.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, and user equipment configured to participate in sidelink scenarios, such as public safety user equipment and/or other commercial user equipment.

Features as described herein generally relate to, while not being limited to, new radio (NR) sidelink (SL) enhancements. For example, NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may be implemented in scenarios unrelated to traffic users, such as public safety scenarios and/or commercial scenarios. Enhancements to sidelink procedures may be applicable in these vehicle-to-everything (V2X) and other use cases. It should be noted that enhancements to sidelink procedures may not be limited to groupcast procedures; a person of ordinary skill in the art would understand that the present disclosure may relate to sidelink unicast, multicast, and/or broadcast procedures as well.

Features as described herein generally relate to sidelink resource allocation enhancements. Features as described herein may also relate to inter-UE coordination. Inter-UE coordination may be used by UE-A to indicate to UE-B about a resource conflict. The coordination information may describe/indicate the presence of expected/potential and/or detected resource conflict on the resources indicated by UE-B's sidelink control information (SCI) (i.e. the UE-B's transmission resource). The coordination information may indicate a set of resources non-preferred for UE-B's transmission and/or the set of resources where a resource conflict is detected. The physical sidelink feedback channel (PSFCH) format may be used to convey the coordination information.

In 3GPP Release-16, new radio (NR) SL has been developed to support advanced vehicle-to-anything (V2X) communications. Compared to long-term evolution (LTE) SL, NR SL is directed to providing higher reliability and lower latency. In order to ensure the reliability of SL transmission, HARQ feedback schemes have been designed in SL unicast and groupcast, such that the SL transmitter (Tx) user equipment (UE) may be aware of the reception status at an intended receiver (Rx) UE. In other words, after the SL Tx UE transmits a sidelink control information (SCI) and the corresponding data payload over the selected/allocated physical sidelink control channel (PSCCH)/physical sidelink share channel (PSSCH) resources, an intended SL Rx UE may indicate its reception status as HARQ feedback (ACK or NACK sequence) transmitted over a PSFCH resource associated to that PSCCH/PSSCH resources. However, the ACK or NACK sequence sent over this PSFCH resource does not convey an indication of a resource conflict.

In a case in which HARQ-feedback is enabled and SL groupcast HARQ option 1 is used (also known as "negative-only acknowledgement", e.g. in TS 38.321), a SL Rx UE within a range of the SL Tx UE may send only a negative-acknowledgement (NACK) feedback if it successfully decodes the sidelink control information (SCI) but fails in decoding the data payload. It may be noted that this approach is also referred as "negative-only acknowledgement" in NR medium access control (MAC) specification TS 38.321. Otherwise, the SL Rx UE will not transmit any feedback. For SL groupcast HARQ option 1, the different SL Rx UEs sending NACK may use a common/shared PSFCH resource. The common/shared PSFCH resource may be determined by SL Rx UEs and the SL Tx UE by considering (1) the starting-subchannel or subchannels and the slot used for the associated PSSCH transmissions, which may depend on the configuration contained in sl-PSFCH-CandidateResourceType; and (2) the Layer-1 (L1) source identifier (ID) provided by the SCI.

In a case in which HARQ-feedback is enabled and SL unicast and SL groupcast HARQ option 2 is used (also known as "negative-positive acknowledgement", e.g. in TS 38.321), a SL Rx UE sends either acknowledgement (ACK) (e.g. if it has received successfully the PSCCH and PSSCH) or NACK (e.g. if it successfully decodes the SCI but fails in decoding the data payload) or nothing (e.g. if it does not decode the SCI). In other words, in HARQ option 2, both ACK and NACK may be transmitted on dedicated PSFCH resources. It may be noted that this approach is also referred as "negative-positive acknowledgement" in NR MAC specification TS 38.321. For SL groupcast HARQ option 2, an intended SL Rx UE may send its feedback over a dedicated PSFCH resource, i.e. UE-specific PSFCH resource. For SL unicast, since there is only one SL Rx UE, the PSFCH resource may be determined by the SL Rx UE and the SL Tx UE by considering the same information as for SL groupcast HARQ option 1, i.e.: (1) the starting-subchannel or subchannels and the slot used for the associated PSSCH transmissions; and (2) the Layer-1 (L1) source ID provided by the SCI.

In SL groupcast HARQ option 2, in order to determine the dedicated PSFCH resource used by each intended SL Rx UE in the group, besides the information needed and listed above for HARQ option 1, a SL Rx UE may also need to use its group member ID obtained from higher layers, wherein the ID may be a unique ID in the considered group. The unique group member ID of each Rx UE may ensure that there is a dedicated PSFCH resource for each Rx UE to send its HARQ feedback. Accordingly, the SL Tx UE may use the same logic to derive the PSFCH resource. For example, the dedicated PSFCH resource for an intended Rx UE may be determined by using modulo operation by considering the L1 source ID provided by the received SCI and its group member ID provided by higher layers. A UE may determine an index of a PSFCH resource for a PSFCH transmission in response to a PSSCH reception as $(P_{ID}+M_{ID})\mod R_{PRB,\ CS}^{PSFCH}$, where $P_{ID}$ is a physical layer source ID provided by SCI format 2-A or 2-B [5, TS 38.212] scheduling the PSSCH reception, and $M_{ID}$ is the identity of the UE receiving the PSSCH, as indicated by higher layers if the UE detects a SCI format 2-A with Cast type indicator field value of "01"; otherwise, $M_{ID}$ is zero. However, this dedicated PSFCH resource is not used to convey an indication of a resource collision.

It has been considered whether to (pre)configure a PSFCH resource set, separately from that of SL HARQ feedback, for resource conflict indication. If a separate PSFCH resource set from that of SL HARQ feedback is used to indicate resource conflict, additional PSFCH resources may need to be reserved for resource conflict indication, which may cause further resource segmentation and reduce the resource efficiency.

In Release-16, a SL groupcast Rx UE in HARQ option 2 may determine its dedicate PSFCH resource for SL HARQ feedback by considering the PSSCH resource, the L1 ID carried in SCI, and the SL groupcast Rx UE's group member ID provided the by higher layers. In contrast, example embodiments of the present disclosure may involve UE-A (i.e. UE detecting a resource conflict) determination of a PSFCH resource for transmitting a resource conflict indication to a UE-B (i.e. UE using resources involved in a conflict) by considering the SL group Tx UE's (i.e. UE-B's) group member ID, rather than the SL group Rx UE's (i.e. UE-A's) group member ID.

Figure 2:
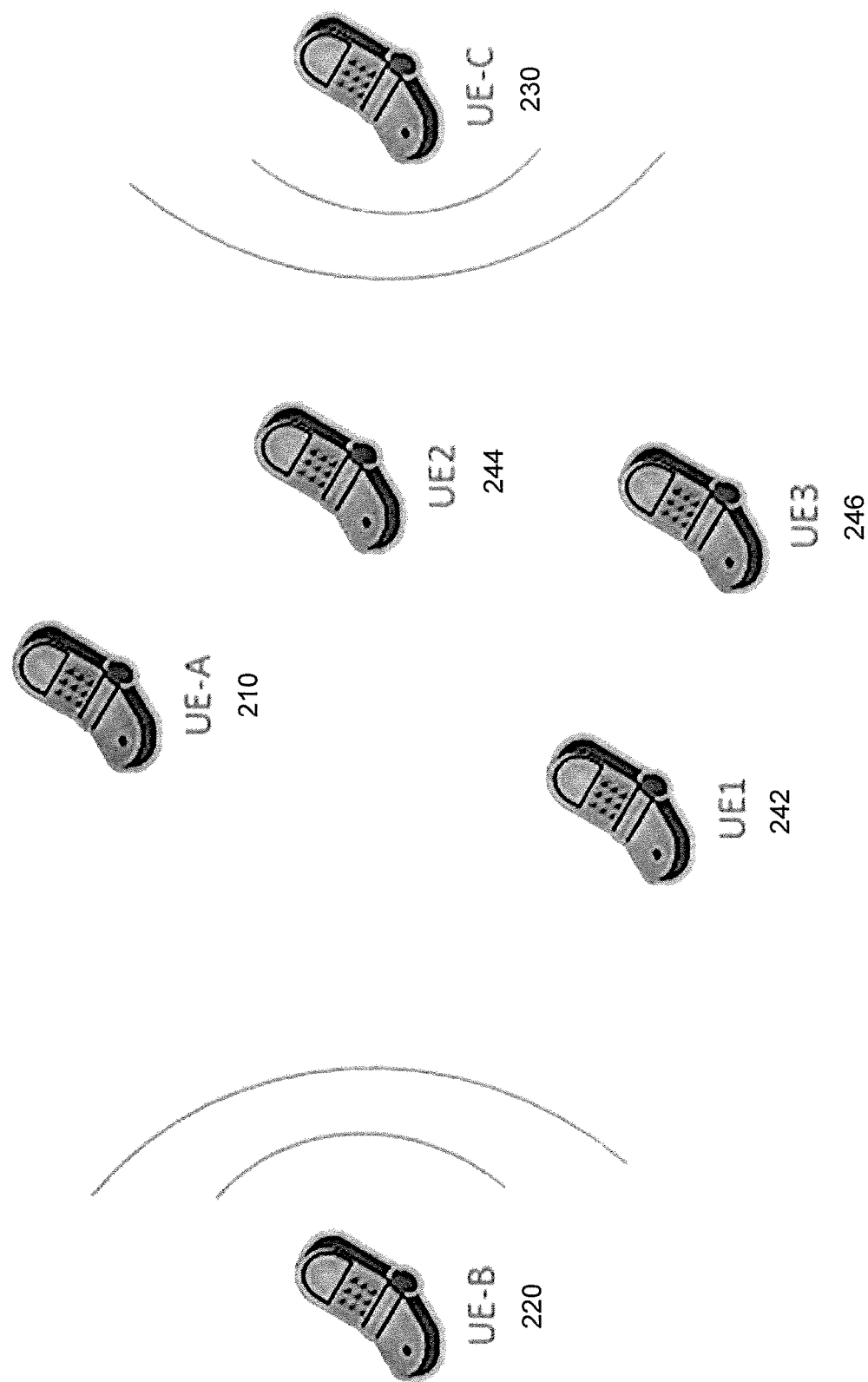
FIG. 2 is a diagram illustrating features as described herein.

Referring now to FIG. 2, illustrated is an example for resource conflict detection where at least some of the example UE are members of a same SL group. In the illustrated example, UE-A (210) may detect a resource conflict between UE-B (220) and UE-C (230), where UE-B (220) may perform a SL groupcast with HARQ option 2.

In the example of FIG. 2, a UE-B (220) may be a group member in a SL group, where UE-B (220) may perform SL groupcast transmission (TX) with HARQ option 2. In an example, there may be a group management function at the upper layer(s), e.g. V2X/application layer in the group leader, which may manage and provide the identity of each group member. Thus, the identity of each group member may be used at the access stratum (AS) layer to facilitate SL groupcast HARQ option 2.

In an example, it may be assumed that the number of UEs in the group is smaller or equal to the number of available PSFCH resources.

In another example, UE-B (220), UE-1 (242), UE-2 (244), and UE-3 (246) may be in the same group, while UE-A (210) and/or UE-C (230) may or may not be in the same group as the other UEs. This is a non-limiting example; other organizations of the UEs within one or more groups may be possible. The UEs may be of a same or different types (e.g. vehicle UE, roadside UE, public safety device, commercial device, etc.). The UEs may have the same or different capabilities.

In another example, if both UE-B (220) and UE-C (230) apply the NR SL mode 2 (i.e. each UE may autonomously select a resource for NR SL transmission), they may select a same SL TX time and/or frequency resource, e.g. due to the hidden node problem, which may cause a resource conflict (as experienced by some of UE1 (242), UE2 (244), UE3 (246) and/or UE-A (210)). In other words, two or more UEs may autonomously select SL transmission resources that are the same or partially the same. The resource conflict may cause a packet loss (e.g. if UE-B (220) and/or UE-C (230) is the half-duplex constrained intended Rx UE of UE-C's and/or UE-B's SL TX, respectively, then UE-B (220) and/or UE-C (230) might not be able to receive an incoming transmission due to half-duplex constraint) or an interference. However, the other group members may be able to detect both transmissions, for example if they are transmitted on different time and/or frequency resources.

In this example, UE-B (220) may perform SL groupcast transmission (with HARQ option-2 enabled) to Rx UEs: UE-1 (242), UE-2 (244), UE-3 (246), and UE-A (210). UE-C (230) may transmit to UE-B (220) concurrently (e.g. via SL broadcast, groupcast or unicast). Because UE-B (220) is in a transmitting state (as it is performing SL groupcast transmission), UE-B (220) may not listen to SL channel, due to half-duplex limitation, and therefore may miss the packets transmitted concurrently from UE-C (230). Hence, there may be a resource conflict. In this scenario, UE-A (210) may receive transmission (with SCI) from both UE-B (220) and UE-C (230), and therefore may identify that there is resource conflict (i.e. UE-A (210) may detect that UE-B (220) may not be able to receive packets from UE-C (230) due to half-duplex constraint, as UE-B (220) is transmitting concurrently) and may send resource conflict indication to UE-B (220) to notify that there was a resource collision.

Example embodiments of the present disclosure may relate to an inter-UE coordination procedure in which a UE-A (e.g. 210) may indicate the resource conflict to at least a UE-B (e.g. 220) upon detecting such a resource conflict.

Example embodiments of the present disclosure may relate to how a UE-A (e.g. 210) should send the resource conflict indication to a UE-B (e.g. 220) upon detecting the conflict.

In another example, the considered resource conflict may be between UE-B (220) and UE-A (210), rather than between UE-B (220) and UE-C (230) as described above. In this case, UE-A (210) may also send the resource conflict indication to UE-B (220) regarding the collision issue.

In this disclosure, the term "UE-A" may be used to describe a UE that detects a resource conflict or identifies potential/expected resource conflict between at least two UEs or between at least one UE and itself. The UE-A may be the intended recipient of a transmission from another UE, or may only observe the transmitted SCI of another UE. In this disclosure, the term "UE-B" may be used to describe a UE that is using one or more (transmission) resources that at least partially overlap with the (transmission) resources of at least one other UE.

In this disclosure, the terms "resource conflict indication" and "inter-UE coordination information" may be used interchangeably; one term may be substituted for the other where only one term is used.

In an example embodiment, upon detecting a resource conflict, a UE-A may transmit its resource conflict indication by reusing the same (pre)configured PSFCH resource set as that used for SL HARQ feedback.

In an example embodiment, a UE-A may receive a SL groupcast TX from a UE-B, wherein the SL groupcast TX may indicate HARQ option 2. For example, the SL groupcast TX from UE-B may include sidelink control information (SCI), which may indicate that the transmission corresponds to SL groupcast with HARQ option-2 (i.e. intended recipients may be expected to provide HARQ ACK/NACK feedback). For example, UE-B may set Cast type indicator as '01' in SCI format 2-A of 2nd stage SCI [TS 38.212]. In an example, UE-A may be in the vicinity of UE-B and may receiver UE-B's transmission, and from the included SCI UE-A may understand/determine that UE-B's transmission is a groupcast transmission with HARQ option-2 enabled. In an example, UE-A and UE-B may or may not be members of the same group.

The SCI may be transmitted in 2 stages (i.e. transmissions) in 5G-NR Sidelink. The 1st-stage SCI mainly carries information regarding the PSSCH resources and information for decoding the 2nd-stage SCI (e.g. time-frequency resources of PSSCH/PSFCH, the priority of this TB transmission, etc.) which are mainly used for channel sensing purposes, to be decodable by any UE. The 2nd-stage SCI mainly carries the remaining scheduling information for the PSSCH decoding by the target UE (e.g. MCS, UE-specific DMRS, NDI, RV, HARQ process ID, etc.). Both source ID and destination ID may be carried in the 2nd-stage SCI to reduce the payload size of the 1st-stage SCI, with the cost of the decoding attempts on two SCIs for all UEs.

The UE-A may detect at least one resource conflict of UE-B, e.g. based on the received SCI and/or data payload of/associated with the received SL groupcast TX. For example, the at least one resource conflict may be between the resources of UE-B and a UE-C, and/or between the resources of UE-B and UE-A. For example, the at least one resource conflict may be a current or potential packet collision. For example, packet loss may not yet have occurred at a resource indicated by UE-B; UE-A may determine, based on analysis, that the resource indicated by UE-B is likely to cause packet loss.

The receiving UE-A may monitor a sidelink resource pool. This monitoring may involve receiving and reading SCIs from nearby UEs. Based on the received SCI, the UE-A may be able to determine whether or not a PSSCH resource of the transmitting UE-B may have resource conflict. If the UE-A detects resource conflict during its SL operation, it may indicate this to the UE-B, as further described below.

The UE-A may determine a PSFCH resource(s) for resource conflict indication by mapping the PSSCH resource indicated in the received SCI, the L1 ID, and the group member ID of UE-B to a PSFCH resource(s). The mapping between the group member ID of UE-B and the determined PSFCH resource(s) may, for example, involve UE-A determination of an index of a PSFCH resource for resource conflict indication by using UE-B's group member ID as $M_{ID}$ in $(P_{ID}+M_{ID}) \mod R_{PRB, CS}^{PSFCH}$, rather than by using UE-A's group member ID as $M_{ID}$, as when the UE-A determines a PSFCH resource for HARQ feedback. In an example embodiment, the determined PSFCH resource may be a resource that the UE-A may use to indicate the detected resource conflict to UE-B (i.e. a resource that UE-B may monitor to receive an indication of a resource conflict).

It may be noted that, in comparison with the SL HARQ scheme defined in Release-16, the PSFCH resource determined based on the group member ID of UE-B (rather than the group member ID of UE-A) may be used by UE-A for transmitting the resource conflict indication. In other words, in response to a PSSCH reception by UE-A, the PSFCH resource determined by UE-A for resource conflict indication is a PSFCH resource associated with transmitting UE-B, rather than a resource associated with receiving UE-A. The UE-A may then use this PSFCH resource determined based on the group member ID of UE-B to indicate the detected resource conflict. It may also be noted that this determined PSFCH resource might not otherwise be in use; in an example embodiment of the present disclosure, this determined PSFCH resource may be used for inter-UE coordination.

The UE-A may transmit the inter-UE coordination information (e.g. resource conflict indication) over the determined PSFCH resource(s). The resource conflict indication may indicate one or more resources used by UE-B for transmission that may currently cause, or may in the future cause, packet loss.

Different sequence(s) may be transmitted by the UE-A in the determined PSFCH resource(s) to indicate different events detected by UE-A. For example, the UE-A may detect more than one resource conflict of UE-B, and may, in response, indicate a plurality of resource conflict indications, or a resource conflict indication configured to indicate more than one resource conflict. For example, the receiving UE-A may detect resource events such as a post/detected resource conflict, an expected/potential resource conflict, a resource conflict with respect to a particular resource, etc. Each type of resource event may be associated with a different sequence of ACK, NACK, or ACK and NACK messages.

In an example embodiment, a UE-B may perform a SL groupcast TX, wherein the SL groupcast TX may indicate HARQ option 2. The UE-B may determine a PSFCH resource(s) by considering the PSSCH resource indicated in the SCI included in/associated with the transmitted SL groupcast TX, the L1 ID, and UE-B's own group member ID. The PSFCH resource(s) determined based on UE-B's group member ID may be monitored by UE-B itself. Based on the monitoring, the UE-B may receive an inter-UE coordination (e.g. resource conflict indication) from/via the determined PSFCH resource.

The PSFCH resource determined by the UE-B for monitoring may be the same as the PSFCH resource determined by the UE-A for transmission of a resource conflict indication (i.e. inter-UE coordination information).

Figure 3:
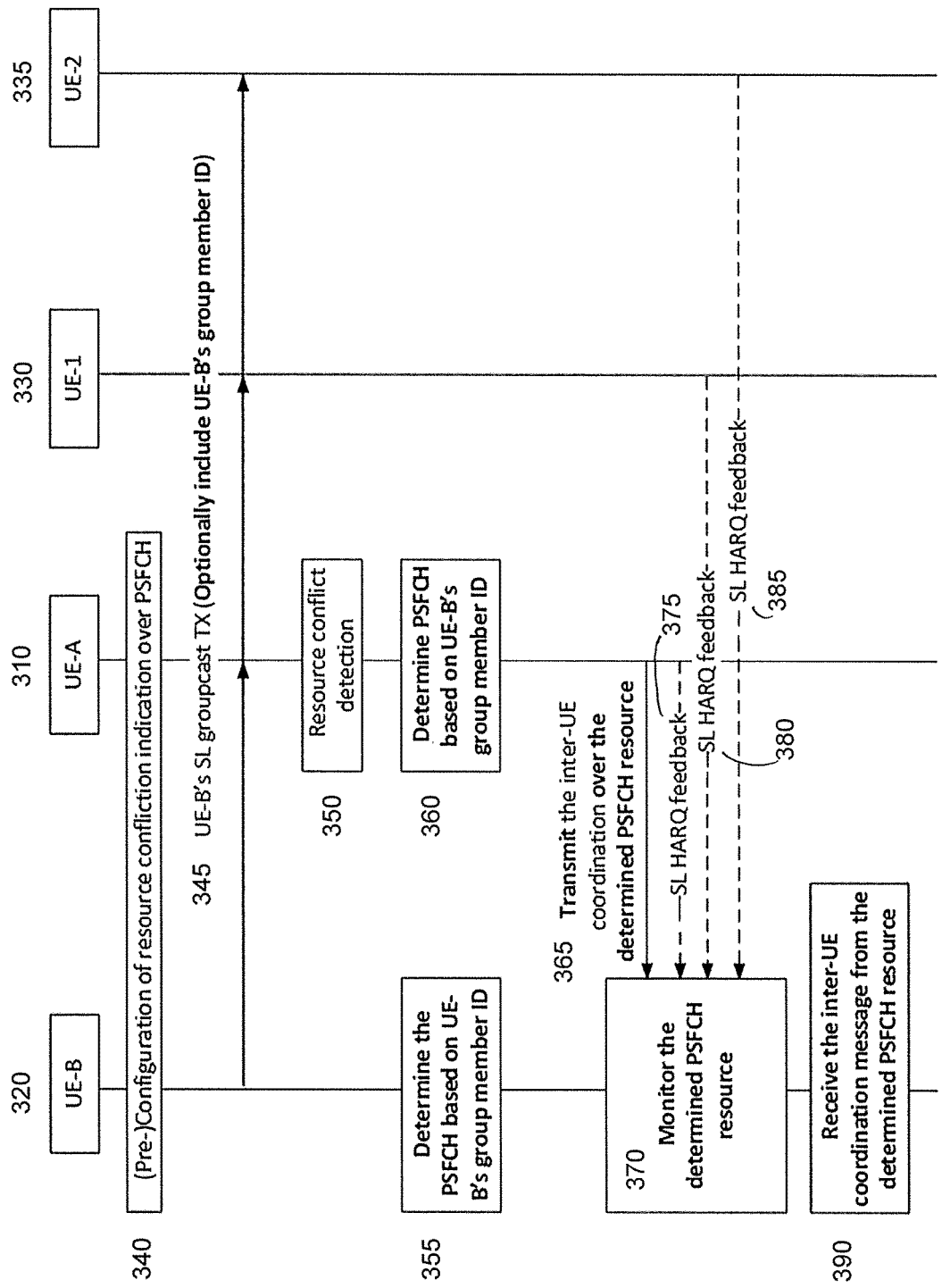
FIG. 3 is a diagram illustrating features as described herein.

Referring now to FIG. 3, illustrated is a flowchart of inter-UE coordination according to an example embodiment of the present disclosure. FIG. 3 illustrates a scenario with four UEs, but example embodiments of the present disclosure may be practiced with more or fewer UEs. In the example of FIG. 3, UE-A (310) and UE-B (320) may determine and use at least one PSFCH resource based on UE-B's group member ID to communicate regarding inter-UE coordination. In the example of FIG. 3, UE-A (310) may be a UE that can detect resource conflict based on received SCI and/or payload information and provide an indication of a resource conflict, and UE-B (320) may be a UE that is configured to transmit a message and monitor for an indication that one or more resources used for the transmission may be involved/expected to be involved in a conflict.

At 340, (pre-) configuration of the resource conflict indication over PSFCH may occur. Both UE-A (310) and UE-B (320) may be (pre-)configured with the same information regarding how to communicate a resource conflict indication over a PSFCH resource that may be determined at 355 and 360, respectively. For example, the configuration may indicate to the UE-A (310) and/or the UE-B (320) which sequences to use for communicating a resource conflict, as further described below. Additionally or alternatively, a UE-B (320) may transmit to UE-A (310) information regarding how to communicate a resource conflict indication.

In an example embodiment, a PSFCH resource (determined at 355 and/or 360) may correspond to a cyclic shift pair, wherein the two different sequence cyclic shifts may be used for sending SL HARQ ACK and/or SL HARQ NACK in Release-16. Correspondingly, the resource conflict over the PSFCH resource may be indicated by different options. In an example embodiment, at 340, UE-A (310) and/or UE-B (320) may be (pre-) configured to indicate/receive an indication of a resource conflict according to one or more different options.

In one example, the sequence of ACK may be used for resource conflict indication. In this case, UE-A (310) may transmit the sequence of ACK to indicate resource conflict. In another example, the sequence of NACK may be used for resource conflict indication. In this case, UE-A (310) may transmit the sequence of NACK to indicate resource conflict. In another example, both ACK and NACK may be used for resource conflict indication. In this case, UE-A (310) may transmit both the sequence of ACK and the sequence of NACK to indicate resource conflict, which may have the technical effect of improving robustness at UE-B (320) for detecting the resource conflict indication. In another example, no sequence transmission over the determined PSFCH resource may indicate that no resource conflict has been detected. In other words, if UE-A (310) does not transmit an ACK or NACK sequence over the determined PSFCH resource, UE-B (320) may determine that there is not a resource conflict for its transmission resources.

In an example embodiment, transmitting different sequence(s) in the determined PSFCH resource (determined in step 3) may indicate different events detected by UE-A (310). For example, transmitting ACK sequence, NACK sequence, both ACK and NACK sequences, and/or transmitting no sequence may be configured/used to indicate at least some of the following events: a post/detected resource conflict, where UE-A (310) may detect that a resource conflict from UE-B (320) happened before/previously; an expected/potential resource conflict, where UE-A (310) may detect/estimate a future resource conflict from UE-B (320); and/or a resource conflict with respect to a particular resource, e.g. UE-B (320) may indicate multiple resources in its SL groupcast TX, and a particular sequence(s) or combination of sequences may be used to indicate a particular resource of the multiple resources where the resource conflict is detected.

At 345, UE-B (320) may perform a SL groupcast TX with HARQ option 2. The SL groupcast TX may be transmitted to and/or received by UE-A (310), UE-1 (330), and/or (UE-2 (335). In an example embodiment, the TX from UE-B (320) may further indicate UE-B's group member ID. The group member ID may be carried in the SCI (e.g. 2nd stage SCI) and/or the payload associated to the SCI (e.g. MAC CE and/or higher layer message).

In another example embodiment, instead of indicating UE-B's group member ID in each SL groupcast TX from UE-B, UE-B (320) may indicate its group member ID only in some of the SL groupcast TXs. For example, UE-B (320) may only indicate its group member ID upon a change of its group member ID and/or the source ID used in its SL groupcast to the considered group. Thus, upon UE-A (310) receiving the indicated group member ID, UE-A (310) may store the information of the UE-B's source ID and the group member ID. Accordingly, for a subsequent SL group TX from UE-B (320) to the considered group with the same source ID of UE-B (320), UE-A (310) may know the group member ID of UE-B (320) based on its stored information. In another example, UE-B (320) may indicate its group member ID by receiving a trigger from another UE, e.g. the group leader. For example, upon a change to the group (e.g. after a new UE joins the group), the group leader may trigger UE-B (320) to indicate its group member ID to other (group member) UEs. In another example, UE-B (320) may be (pre-)configured with a timer to determine if it should indicate its group member ID. For example, UE-B (320) may only indicate its group member ID in two SL TXs, if the time gap between the two SL TXs is larger than T.

In another example embodiment, UE-B's group member ID associated to UE-B's source ID may be transmitted and indicated by another UE, which may be the group leader, to UE-A (310).

In another example embodiment, UE-B's SL groupcast TX may not need to indicate UE-B's group member ID. In other words, UE-B (320) might not include UE-B's group member ID in SCI of the SL groupcast TX at 345. For example, if UE-A (310) is the group leader, it may (already) know UE-B's group member ID, since the group member ID of UE-B (320) may be assigned by UE-A's group management function. Thus, upon receiving UE-B's SL groupcast TX, UE-A (310) may already know UE-B's group member ID. It may be noted that, in 3GPP RAN1, determination of UE-A (310) may be left to upper layer, e.g. V2X/application layer. Accordingly, the group leader may act as receiver UE configured to detect resource conflict in some scenarios (e.g. UE-A (310)).

At 350, UE-A (310) may perform resource conflict detection. UE-A (310) may detect a resource conflict based on the received SL groupcast TX from UE-B (320) at 345. The detected resource conflict may be between UE-B (320) and UE-A (310), UE-1 (330), and/or UE-2 (335). Additionally or alternatively, the detected resource conflict may be between UE-B (320) and a UE outside the group of UEs illustrated in FIG. 3. UE-A (310) may detect a resource conflict based on SCI associated with UE-B (320) and SCI associated with another UE.

At 360, 355, both UE-A (310) and UE-B (320) may determine a PSFCH resource based on UE-B's group member ID, wherein the determined PSFCH resource may be used by UE-A (310) and UE-B (320) to communicate the inter-UE coordination message, e.g. resource conflict indication. For example, UE-A/UE-B may determine an index of a PSFCH resource for a PSFCH transmission in response to the PSSCH reception at 345 according to $(P_{ID}+M_{ID}) \mod R_{PRB,\ CS}^{PSFCH}$, where $P_{ID}$ is a physical layer/L1 source ID, which may be provided by SCI at 345, and $M_{ID}$ is the group member ID of the SL groupcast Tx UE, i.e. UE-B (320). In an example, $R_{PRB,\ CS}^{PSFCH}$ is the number of PSFCH resources available for multiplexing HARQ-ACK information in a PSFCH transmission. Another rule for deriving the PSFCH resource at 360, 355 may be possible.

At 365, UE-A (310) may transmit the resource conflict indication (i.e. inter-UE coordination information) to UE-B (320) over the PSFCH resource determined at 360, while at 370 UE-B (320) may monitor the determined PSFCH resource determined at 355. For example, the UE-B may monitor the determined PSFCH resource for each of its transmission(s). The resource conflict indication transmitted over the determined PSFCH resource may contain the sequence(s) used for SL HARQ ACK and/or SL HARQ NACK, as per the (pre-)configuration at 340.

Optionally, since UE-B's SL groupcast TX at 345 may indicate the use of HARQ option 2, each of the intended Rx UEs in the group may send its SL HARQ feedbacks over its dedicated PSFCH resource by considering its own group member ID, e.g. the same as in Release-16 (e.g. at 375, 380, and/or 385). In other words, UE-A (310) may determine at least one PSFCH resource based on the group member ID of UE-B (320) for transmission of a resource conflict indication, and may determine at least one other (different) PSFCH resource based on the group member ID of UE-A (310) for transmission of SL HARQ feedback, where UE-A (310) may be an intended recipient of the transmission at 345.

In an example, UE-A (310), UE-1 (330), and UE-2 (335) may determine PSFCH resources PSFCH-A, PSFCH-1, and PSFCH-2, respectively, for their SL HARQ feedback. These PSFCH resources (PSFCH-A, PSFCH-1, and PSFCH-2) may be different from the PSFCH resource determined at 360, which might not be used for sending the HARQ feedback, but instead may be used for resource conflict indication.

At 390, by monitoring the determined PSFCH resource, UE-B (320) may receive the inter-UE coordination message, i.e. the resource conflict indication, from/on the determined PSFCH resource. Upon receiving the resource conflict indication, UE-B may perform resource pre-emption, resource re-evaluation, resource reselection and/or retransmission.

In an example embodiment, transmitting the resource conflict indication (e.g. at 365) may include transmitting the same or different sequence(s) in multiple determined PSFCH resources, wherein the multiple PSFCH may be respectively associated to multiple SL groupcast TXs from UE-B (320), and each of the multiple PSFCH resources may be derived according to example embodiments of the present disclosure as described above. In one example, if UE-B (320) indicates a set of periodic SL groupcast TX in its transmitted SCI at 345, UE-A (310) may transmit the same or the different sequence(s) over the determined multiple PSFCH resources at 365, wherein the determined multiple PSFCH resources may occur non-concurrently in the time domain, and may be respectively associated to the multiple periodic SL groupcast TXs from UE-B (320). Accordingly, UE-B (320) may detect an indicated resource conflict by receiving UE-A's transmissions from the multiple determined PSFCH resources at 370. It may be a technical effect of this example embodiment to enhance the accuracy for communicating the resource conflict indication and/or improve/increase the number of events that can be indicated by UE-A (310), since there are more combination options of the transmitted sequences in the multiple determined PSFCH resources. In an example, transmitting only one NACK sequence in one determined PSFCH resource may indicate a post/detected collision for the PSCCH/PSSCH resource associated to the determined PSFCH resource, while transmitting two NACK sequences in two determined PSFCH resources may indicate a periodic resource conflict of the PSCCH/PSSCH resources associated to the two determined PSFCH resources. In other words, multiple PSFCH resources may be determined for resource conflict indication (e.g. each associated with a different transmission of UE-B). In an example embodiment, UE-A may use one or more resources in combination with one or more sequences to indicate different types/events of resource conflicts.

In an example embodiment, the choice of which sequence(s) to be transmitted in the determined PSFCH resource (i.e. at 360, 365) may be related with the resource indication information obtained from UE-B (320), e.g. at 345 of FIG. 3. For example, if UE-B's transmitted SCI indicates only one SL resource, UE-A (310) may use a particular sequence or sequence combination to indicate the resource conflict. If UE-B's transmitted SCI indicates two SL resources, different sequences may be used to indicate the resource conflicts for the different SL resources.

In an example embodiment, UE-A (310) may be (pre-)configured with priority information (e.g. priority of the resource conflict indication) at 340, which may determine if UE-A (310) should prioritize transmission of resource conflict indication over UE-A's other communication activities, such as SL/UL transmission/reception. For example, the priority of the resource conflict indication may be fixed, e.g. by a specification, which may be pre-configured or obtained from a network. In another example, the priority of the resource conflict indication may be determined based on the SL TX (e.g. 345), where the resource conflict may be detected, for example, based on the priority of the conflicted SL TX. After determining the priority of the conflict indication, UE-A (310) may perform prioritization, e.g. according to Release-16.

In an example embodiment, if UE-A (310) is an intended RX UE of UE-B's SL TX at 345, where a resource conflict of the UE-B's SL TX is detected at 350 and UE-A (310) is not able to transmit both the resource conflict indication and its own HARQ ACK/NACK feedback towards UE-B (320), UE-A (310) may be (pre-)configured with priority information on whether or not to prioritize transmission of resource conflict indication over transmission of its own HARQ ACK/NACK towards UE-B (320), for example at 340. In one example embodiment, UE-A (310) may be configured to prioritize resource conflict indication transmission, upon detection of resource conflict for an ongoing transmission from UE-B (32) to itself (i.e. UE-A (310) may be one of one or more intended recipients). Thus, UE-A (310) may prioritize sending a resource conflict indication (at 365) over transmission of its own HARQ ACK/NACK feedback (at 375) to UE-B (320) if it cannot simultaneously transmit both resource conflict indication and HARQ ACK/NACK feedback.

In another example embodiment, the priority information may vary for different resource conflict events, the PSCCH/PSSCH reception status (success/unsuccessful) at UE-A (310), and/or whether or not the transmission from UE-B (320) is a new transmission or a re-transmission. For example, UE-A (310) may prioritize: a post resource conflict indication transmission over HARQ NACK, since UE-B (320) may be triggered by the post resource conflict indication for retransmission even when no HARQ feedback is received from UE-A (310); for a resource conflict regarding a retransmission, resource conflict indication over HARQ feedback if UE-A (310) has already sent HARQ ACK before for the same TB; and or HARQ ACK feedback transmission over pre-resource conflict indication, since UE-A (310) may indicate the resource conflict on the subsequent PSFCH resource(s).

In another example embodiment, UE-A (310) may autonomously decide to prioritize a resource conflict indication (at 365) over transmission of its own HARQ ACK/NACK (at 375). In one embodiment, UE-A (310) may determine to skip its resource conflict indication, based on the number of potential UE-A(s) available/existing for indicating the same resource conflict. For example, if there are a large number of UE-As, the considered UE-A (310) may skip its resource conflict indication and rely on other UE-A(s) to transmit the resource conflict indication. A considered UE-A may determine that there are other UE-As that may transmit the resource conflict indication (i.e. UE density) based on one or more measurements, such as a channel busy ratio (CBR) or a number of UEs/links around the UE-A.

In another example embodiment, along with sequence of NACK (or ACK) for resource conflict indication in the determined PSFCH resource (at 365), UE-A (310) may (not)transmit ACK (or NACK) sequence to indicate its own HARQ feedback (at 375). For example, UE-A (310) may transmit only a NACK sequence to indicate resource conflict and unsuccessful TB transmission (HARQ NACK equivalent). Additionally or alternatively, UE-A (310) may transmit only an ACK sequence to indicate resource conflict without HARQ feedback. Additionally or alternatively, UE-A (310) may transmit both NACK and ACK sequences to indicate resource conflict and successful TB transmission (HARQ ACK equivalent). In other words, the transmitted sequence for resource conflict indication may or may not also serve as HARQ feedback.

In an example embodiment, if the group leader acts as the UE-A (310), it may know the group member ID of UE-B (320). Thus, UE-B (320) may not need to inform UE-A (310) about UE-B's group member ID. In another example embodiment, if UE-B (320) is the group leader, it may need to indicate its group member ID to other (group member) UEs, for example as part of UE-B's SL groupcast TX at 345, or by using another separate message.

In an example embodiment, if UE-B's group member ID is explicitly indicated by UE-B (320), other non-group member UEs may also act as UE-A (310) to indicate the detected resource conflict, as long as they obtain the UE-B's group member ID. In other words, a UE that is capable of detecting resource conflict and determining the group member ID of UE-B (320) may be enabled to perform example embodiments of the present disclosure. If a UE is not capable of determining the group member ID of UE-B (320), the UE might not be able to perform example embodiments of the present disclosure.

In an example embodiment, UE-A (310) may indicate a resource conflict using the PSFCH resource based on UE-B's group member ID, while a separate set of PSFCH resources, different from the SL HARQ feedback resources for use by UE-A (310), may be configured and used by UE-A (310) to transmit further resource conflict indication information, e.g. with a finer granularity. For example, the further resource conflict indication information may indicate whether the resource conflict refers to a post resource conflict or an expected/potential resource conflict. In this case, UE-B (320) may first monitor the PSFCH resource determined according to example embodiments of the present disclose (i.e. based on UE-B's group member ID). If UE-B (320) receives a resource conflict indication from the determined PSFCH resource (e.g. at 390), it may monitor the separate set of PSFCH resources, or PSCCH/PSSCH, for further information about the detected resource conflict. If UE-B (320) does not receive a resource conflict indication from the determined PSFCH resource, UE-B (320) may not need to monitor the separate set of PSFCH resources, or UE-B (320) may not need to expect further information on resource conflict to be delivered over PSCCH/PSSCH. In other words, UE-B (320) may only monitor the separate set of PSFCH resources if it receives a resource conflict indication from the determined PSFCH resource.

Example embodiments of the present disclosure may also be applicable to SL unicast and SL groupcast option 1. For example, a PSFCH resource for resource conflict indication may be mapped to a L1 destination ID instead of a member ID, and UE-A (310) may determine the PSFCH resource for resource conflict indication based on the destination ID included in the SCI from UE-B (310). The UE-B may monitor this determined PSFCH resource to detect/receive the resource conflict indication.

While in example embodiments of the present disclosure a receiving UE-A (310) is often described as transmitting inter-UE coordination information (e.g. at 365) to a single transmitting UE-B (320), in other examples a UE-A (310) may transmit inter-UE coordination information to multiple transmitting UEs, using for each a PSFCH resource determined based on the group member ID of the respective transmitting UE.

FIG. 4 illustrates the potential steps of an example method 400. The example method 400 may include: determining a group member identifier of at least one user equipment that has performed transmission, 410; determining at least one physical sidelink feedback channel resource based, at least partially, on the determined group member identifier, 420; and transmitting, with the at least one determined physical sidelink feedback channel resource to the at least one user equipment that has performed transmission, an indication of a resource conflict associated with the at least one user equipment, 430. The resource conflict may be a conflict in time resources, frequency resources, or both.

Figure 5:
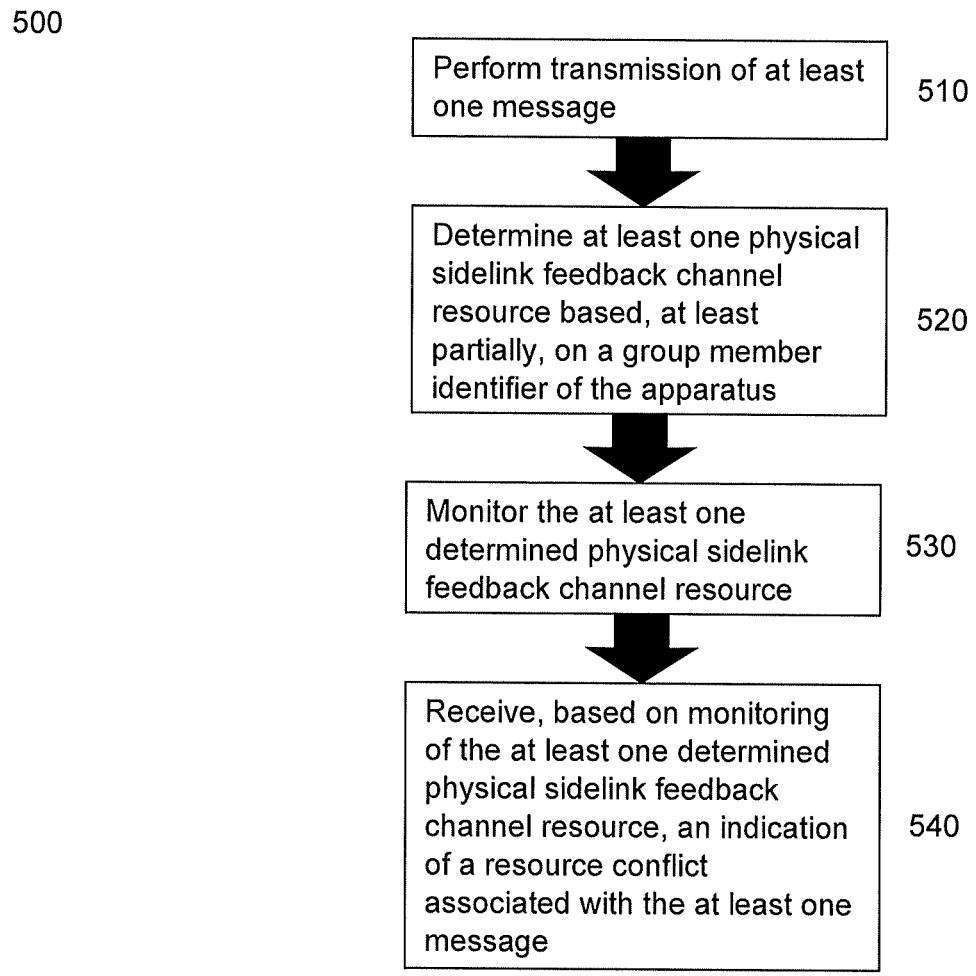
FIG. 5 is a flowchart illustrating steps as described herein.

FIG. 5 illustrates the potential steps of an example method 500. The example method 500 may include: performing transmission of at least one message, 510; determining at least one physical sidelink feedback channel resource based, at least partially, on a group member identifier of the apparatus, 520; monitoring the at least one determined physical sidelink feedback channel resource, 530; and receiving, based on monitoring of the at least one determined physical sidelink feedback channel resource, an indication of a resource conflict associated with the at least one message, 540.

It may be noted that, according to example embodiments of the present disclosure, UE-B's own dedicated PSFCH resource will not be used by itself for receiving the SL HARQ feedback.

A technical effect of example embodiments of the present disclosure may be to avoid introducing a separate PSFCH resource configuration for indicating resource conflict.

A technical effect of example embodiments of the present disclosure may be to avoid changing the MAC specification regarding how to select the HARQ option 2 based on group size and available PSFCH resources, as example embodiments of the present disclosure might not require the use of new dedicated PSFCH resource.

A technical effect of example embodiments of the present disclosure may be that, if UE-B is a Release-16 Tx UE, its HARQ re-TX behavior might not be impacted, since it will not monitor its own dedicated PSFCH resource. In other words, example embodiments of the present disclosure may have the technical effect of providing backward-compatibility.

A technical effect of example embodiments of the present disclosure may be that UE-B (320) may only need to monitor the same PSFCH PRB resources as those used for receiving the SL HARQ feedbacks, which may reduce power consumption for a power constrained UE-B (320).

In accordance with one example embodiment, an apparatus may comprise: at least one processor; and at least one memory including computer program code; the at least one memory and the computer program code configured to, with the at least one processor, cause the apparatus at least to perform: determine a group member identifier of at least one user equipment that has performed transmission; determine at least one physical sidelink feedback channel resource based, at least partially, on the determined group member identifier; and transmit, with the at least one determined physical sidelink feedback channel resource to the at least one user equipment that has performed transmission, an indication of a resource conflict associated with the at least one user equipment.

The example apparatus may be further configured to: determine the resource conflict based, at least partially, on an indication received from another apparatus.

The example apparatus may be further configured to: receive a transmission from the at least one user equipment; and detect the resource conflict based, at least partially, on the received transmission.

Determining the group member identifier may be based, at least partially, on the received transmission, wherein the received transmission may comprise a sidelink control information, wherein the sidelink control information may at least one of: includes the group member identifier, or be associated with a payload, wherein the payload may comprise an indication of the group member identifier.

Determining the at least one physical sidelink feedback channel resource may be further based, at least partially, on at least one of: at least one physical sidelink shared channel resource associated with at least one transmission received from the at least one user equipment, a physical layer source identifier included in the at least one received transmission, or a number of physical sidelink feedback channel resources available for multiplexing hybrid automatic repeat request acknowledgement information in a physical sidelink feedback channel transmission.

The example apparatus may be further configured to: receive, from the at least one user equipment, information for transmitting the indication of the resource conflict, wherein transmitting the indication may be based, at least partially, on the received information.

The example apparatus may be further configured to: receive a configuration for transmitting the indication of the resource conflict, wherein transmitting the indication may be based, at least partially, on the received configuration.

The configuration may comprise at least one indication of a physical sidelink feedback channel sequence configured to indicate at least one of: a detected resource conflict, a potential resource conflict, a detected resource conflict with respect to a particular resource associated with the received transmission, or a potential resource conflict with respect to the particular resource.

Determining the at least one physical sidelink feedback channel resource may comprise the example apparatus being further configured to: map the group member identifier of the at least one user equipment to the at least one physical sidelink feedback channel resource.

The indication of the resource conflict may comprise a physical sidelink feedback channel sequence.

The physical sidelink feedback channel sequence may comprise a sequence configured to indicate at least one of: a detected resource conflict, a potential resource conflict, a detected resource conflict with respect to a particular resource associated with the received transmission, or a potential resource conflict with respect to the particular resource.

The physical sidelink feedback channel sequence may comprise at least one of: a negative acknowledgement sequence, or an acknowledgement sequence.

The example apparatus may be further configured to perform at least one of: receive the group member identifier from another user equipment, or receive an indication of the group member identifier from a group management function of an upper layer.

Transmitting, with the at least one determined physical sidelink feedback channel resource to the at least one user equipment, the indication of the resource conflict may comprise the example apparatus being further configured to perform at least one of: transmit the indication with a plurality of determined physical sidelink feedback channel resources, or transmit an indication of a plurality of indications of the resource conflict with a respective physical sidelink feedback channel resource of the plurality of determined physical sidelink feedback channel resources, wherein the plurality of determined physical sidelink feedback channel resources may respectively correspond to a plurality of physical sidelink shared channel resources associated with transmissions of the at least one user equipment.

Transmitting the indication of the resource conflict may be based, at least partially, on at least one of: a priority of the indication of the resource conflict, a priority of sidelink hybrid automatic repeat request feedback corresponding to a transmission received from the at least one user equipment, a type of the determined resource conflict, or a reception status of the received transmission.

The indication of the resource conflict may be configured to indicate hybrid automatic repeat request feedback corresponding to a transmission received from the at least one user equipment.

The example apparatus may be further configured to: transmit, with at least one physical sidelink feedback channel resource of a set of physical sidelink feedback channel resources, further information corresponding to the resource conflict.

In accordance with one aspect, an example method may be provided comprising: determining a group member identifier of at least one user equipment that has performed transmission; determining at least one physical sidelink feedback channel resource based, at least partially, on the determined group member identifier; and transmitting, with the at least one determined physical sidelink feedback channel resource to the at least one user equipment that has performed transmission, an indication of a resource conflict associated with the at least one user equipment.

The example method may further comprise: determining the resource conflict based, at least partially, on an indication received from another apparatus.

The example method may further comprise: receiving a transmission from the at least one user equipment; and detecting the resource conflict based, at least partially, on the received transmission.

The determining of the group member identifier may be based, at least partially, on the received transmission, wherein the received transmission may comprise a sidelink control information, wherein the sidelink control information may at least one of: include the group member identifier, or be associated with a payload, wherein the payload may comprise an indication of the group member identifier.

The determining of the at least one physical sidelink feedback channel resource may be further based, at least partially, on at least one of: at least one physical sidelink shared channel resource associated with at least one transmission received from the at least one user equipment, a physical layer source identifier included in the at least one received transmission, or a number of physical sidelink feedback channel resources available for multiplexing hybrid automatic repeat request acknowledgement information in a physical sidelink feedback channel transmission.

The example method may further comprise: receiving, from the at least one user equipment, information for transmitting the indication of the resource conflict, wherein the transmitting of the indication may be based, at least partially, on the received information.

The example method may further comprise: receiving a configuration for transmitting the indication of the resource conflict, wherein the transmitting of the indication may be based, at least partially, on the received configuration.

The configuration may comprise at least one indication of a physical sidelink feedback channel sequence configured to indicate at least one of: a detected resource conflict, a potential resource conflict, a detected resource conflict with respect to a particular resource associated with the received transmission, or a potential resource conflict with respect to the particular resource.

The determining of the at least one physical sidelink feedback channel resource may comprise: mapping the group member identifier of the at least one user equipment to the at least one physical sidelink feedback channel resource.

The indication of the resource conflict may comprise a physical sidelink feedback channel sequence.

The physical sidelink feedback channel sequence may comprise a sequence configured to indicate at least one of: a detected resource conflict, a potential resource conflict, a detected resource conflict with respect to a particular resource associated with the received transmission, or a potential resource conflict with respect to the particular resource.

The physical sidelink feedback channel sequence may comprise at least one of: a negative acknowledgement sequence, or an acknowledgement sequence.

The example method may further comprise: receiving the group member identifier from another user equipment, or receiving an indication of the group member identifier from a group management function of an upper layer.

The transmitting, with the at least one determined physical sidelink feedback channel resource to the at least one user equipment, of the indication of the resource conflict may comprise: transmitting the indication with a plurality of determined physical sidelink feedback channel resources, or transmitting an indication of a plurality of indications of the resource conflict with a respective physical sidelink feedback channel resource of the plurality of determined physical sidelink feedback channel resources, wherein the plurality of determined physical sidelink feedback channel resources may respectively correspond to a plurality of physical sidelink shared channel resources associated with transmissions of the at least one user equipment.

The transmitting of the indication of the resource conflict may be based, at least partially, on at least one of: a priority of the indication of the resource conflict, a priority of sidelink hybrid automatic repeat request feedback corresponding to a transmission received from the at least one user equipment, a type of the determined resource conflict, or a reception status of the received transmission.

The indication of the resource conflict may be configured to indicate hybrid automatic repeat request feedback corresponding to a transmission received from the at least one user equipment.

The example method may further comprise: transmitting, with at least one physical sidelink feedback channel resource of a set of physical sidelink feedback channel resources, further information corresponding to the resource conflict.

In accordance with one example embodiment, an apparatus may comprise: circuitry configured to perform: determine a group member identifier of at least one user equipment that has performed transmission; determine at least one physical sidelink feedback channel resource based, at least partially, on the determined group member identifier; and transmit, with the at least one determined physical sidelink feedback channel resource to the at least one user equipment that has performed transmission, an indication of a resource conflict associated with the at least one user equipment.

In accordance with one example embodiment, an apparatus may comprise: processing circuitry; memory circuitry including computer program code, the memory circuitry and the computer program code configured to, with the processing circuitry, enable the apparatus to: determine a group member identifier of at least one user equipment that has performed transmission; determine at least one physical sidelink feedback channel resource based, at least partially, on the determined group member identifier; and transmit, with the at least one determined physical sidelink feedback channel resource to the at least one user equipment that has performed transmission, an indication of a resource conflict associated with the at least one user equipment.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: determining a group member identifier of at least one user equipment that has performed transmission; determining at least one physical sidelink feedback channel resource based, at least partially, on the determined group member identifier; and transmitting, with the at least one determined physical sidelink feedback channel resource to the at least one user equipment that has performed transmission, an indication of a resource conflict associated with the at least one user equipment.

In accordance with one example embodiment, a non-transitory computer-readable medium comprising program instructions stored thereon which, when executed with at least one processor, cause the at least one processor to: determine a group member identifier of at least one user equipment that has performed transmission; determine at least one physical sidelink feedback channel resource based, at least partially, on the determined group member identifier; and transmit, with the at least one determined physical sidelink feedback channel resource to the at least one user equipment that has performed transmission, an indication of a resource conflict associated with the at least one user equipment.

In accordance with another example embodiment, a non-transitory program storage device readable by a machine may be provided, tangibly embodying a program of instructions executable by the machine for performing operations, the operations comprising: determine a group member identifier of at least one user equipment that has performed transmission; determine at least one physical sidelink feedback channel resource based, at least partially, on the determined group member identifier; and transmit, with the at least one determined physical sidelink feedback channel resource to the at least one user equipment that has performed transmission, an indication of a resource conflict associated with the at least one user equipment.

In accordance with one example embodiment, an apparatus may comprise: at least one processor; and at least one memory including computer program code; the at least one memory and the computer program code configured to, with the at least one processor, cause the apparatus at least to perform: perform transmission of at least one message; determine at least one physical sidelink feedback channel resource based, at least partially, on a group member identifier of the apparatus; monitor the at least one determined physical sidelink feedback channel resource; and receive, based on monitoring of the at least one determined physical sidelink feedback channel resource, an indication of a resource conflict associated with the at least one message.

The at least one message may comprise a sidelink control information, wherein the sidelink control information may at least one of: include the group member identifier, or be associated with a payload, wherein the payload may comprise an indication of the group member identifier.

Determining the at least one physical sidelink feedback channel resource may be further based, at least partially, on at least one of: at least one physical sidelink shared channel resource associated with the at least one transmitted message, a physical layer source identifier included in the at least one transmitted message, or a number of physical sidelink feedback channel resources available for multiplexing hybrid automatic repeat request acknowledgement information in a physical sidelink feedback channel transmission.

The indication of the resource conflict may comprise a physical sidelink feedback channel sequence.

The physical sidelink feedback channel sequence may comprise a sequence configured to indicate at least one of: a detected resource conflict, a potential resource conflict, a detected resource conflict with respect to a particular resource associated with the at least one transmitted message, or a potential resource conflict with respect to the particular resource.

The physical sidelink feedback channel sequence may comprise at least one of: a negative acknowledgement sequence, or an acknowledgement sequence.

The example apparatus may be further configured to: include an indication of the group member identifier of the apparatus with the at least one transmitted message based, at least partially, on one of: a determination that the group member identifier of the apparatus changed after a last transmission of the apparatus, a timer, or a trigger received from a group leader.

The example apparatus may be further configured to: receive a configuration for receiving the indication of the resource conflict, wherein receiving the indication may be based, at least partially, on the received configuration.

The configuration may comprise at least one indication of a physical sidelink feedback channel sequence configured to indicate at least one of: a detected resource conflict, a potential resource conflict, a detected resource conflict with respect to a particular resource associated with the at least one transmitted message, or a potential resource conflict with respect to the particular resource.

The indication of the resource conflict may be configured to indicate hybrid automatic repeat request feedback corresponding to the at least one message.

In accordance with one aspect, an example method may be provided comprising: performing, with an apparatus, transmission of at least one message; determining at least one physical sidelink feedback channel resource based, at least partially, on a group member identifier of the apparatus; monitoring the at least one determined physical sidelink feedback channel resource; and receiving, based on monitoring of the at least one determined physical sidelink feedback channel resource, an indication of a resource conflict associated with the at least one message.

The at least one message may comprise a sidelink control information, wherein the sidelink control information at least one of: includes the group member identifier, or is associated with a payload, wherein the payload comprises an indication of the group member identifier.

The determining of the at least one physical sidelink feedback channel resource may be further based, at least partially, on at least one of: at least one physical sidelink shared channel resource associated with the at least one transmitted message, a physical layer source identifier included in the at least one transmitted message, or a number of physical sidelink feedback channel resources available for multiplexing hybrid automatic repeat request acknowledgement information in a physical sidelink feedback channel transmission.

The indication of the resource conflict may comprise a physical sidelink feedback channel sequence.

The physical sidelink feedback channel sequence may comprise a sequence configured to indicate at least one of: a detected resource conflict, a potential resource conflict, a detected resource conflict with respect to a particular resource associated with the at least one transmitted message, or a potential resource conflict with respect to the particular resource.

The physical sidelink feedback channel sequence may comprise at least one of: a negative acknowledgement sequence, or an acknowledgement sequence.

The example method may further comprise: including an indication of the group member identifier of the apparatus with the at least one transmitted message based, at least partially, on one of: a determination that the group member identifier of the apparatus changed after a last transmission of the apparatus, a timer, or a trigger received from a group leader.

The example method may further comprise: receiving a configuration for receiving the indication of the resource conflict, wherein receiving the indication is based, at least partially, on the received configuration.

The configuration may comprise at least one indication of a physical sidelink feedback channel sequence configured to indicate at least one of: a detected resource conflict, a potential resource conflict, a detected resource conflict with respect to a particular resource associated with the at least one transmitted message, or a potential resource conflict with respect to the particular resource.

The indication of the resource conflict may be configured to indicate hybrid automatic repeat request feedback corresponding to the at least one message.

In accordance with one example embodiment, an apparatus may comprise: circuitry configured to perform: perform transmission of at least one message; determine at least one physical sidelink feedback channel resource based, at least partially, on a group member identifier of the apparatus; monitor the at least one determined physical sidelink feedback channel resource; and receive, based on monitoring of the at least one determined physical sidelink feedback channel resource, an indication of a resource conflict associated with the at least one message.

In accordance with one example embodiment, an apparatus may comprise: processing circuitry; memory circuitry including computer program code, the memory circuitry and the computer program code configured to, with the processing circuitry, enable the apparatus to: perform transmission of at least one message; determine at least one physical sidelink feedback channel resource based, at least partially, on a group member identifier of the apparatus; monitor the at least one determined physical sidelink feedback channel resource; and receive, based on monitoring of the at least one determined physical sidelink feedback channel resource, an indication of a resource conflict associated with the at least one message.

In accordance with one example embodiment, an apparatus may comprise means for performing: performing transmission of at least one message; determining at least one physical sidelink feedback channel resource based, at least partially, on a group member identifier of the apparatus; monitoring the at least one determined physical sidelink feedback channel resource; and receiving, based on monitoring of the at least one determined physical sidelink feedback channel resource, an indication of a resource conflict associated with the at least one message.

In accordance with one example embodiment, a non-transitory computer-readable medium comprising program instructions stored thereon which, when executed with at least one processor, cause the at least one processor to: perform, with an apparatus, transmission of at least one message; determine at least one physical sidelink feedback channel resource based, at least partially, on a group member identifier of the apparatus; monitor the at least one determined physical sidelink feedback channel resource; and receive, based on monitoring of the at least one determined physical sidelink feedback channel resource, an indication of a resource conflict associated with the at least one message.

In accordance with another example embodiment, a non-transitory program storage device readable by a machine may be provided, tangibly embodying a program of instructions executable by the machine for performing operations, the operations comprising: perform, with an apparatus, transmission of at least one message; determine at least one physical sidelink feedback channel resource based, at least partially, on a group member identifier of the apparatus; monitor the at least one determined physical sidelink feedback channel resource; and receive, based on monitoring of the at least one determined physical sidelink feedback channel resource, an indication of a resource conflict associated with the at least one message.

In accordance with another example embodiment, a computer program may comprise instructions stored thereon for performing at least the following: determining a group member identifier of at least one user equipment that has performed transmission; determining at least one physical sidelink feedback channel resource based, at least partially, on the determined group member identifier; and transmitting, with the at least one determined physical sidelink feedback channel resource to the at least one user equipment that has performed transmission, an indication of a resource conflict associated with the at least one user equipment.

In accordance with another example embodiment, a computer program may comprise instructions stored thereon for performing at least the following: performing, with an apparatus, transmission of at least one message; determining at least one physical sidelink feedback channel resource based, at least partially, on a group member identifier of the apparatus; monitoring the at least one determined physical sidelink feedback channel resource; and receiving, based on monitoring of the at least one determined physical sidelink feedback channel resource, an indication of a resource conflict associated with the at least one message.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory including computer program code;
   the at least one memory and the computer program code configured to, with the at least one processor, cause the apparatus at least to:
     determine a group member identifier of at least one user equipment that has performed transmission;
     determine at least one physical sidelink feedback channel resource based, at least partially, on the determined group member identifier; and
     transmit, with the at least one determined physical sidelink feedback channel resource to the at least one user equipment that has performed transmission, an indication of a resource conflict associated with the at least one user equipment, wherein the indication of the resource conflict comprises a physical sidelink feedback channel sequence.

2. The apparatus of claim 1, wherein the at least one memory and the computer program code are further configured to, with the at least one processor, cause the apparatus at least to:
   determine the resource conflict based, at least partially, on an indication received from another apparatus.

3. The apparatus of claim 1, wherein the at least one memory and the computer program code are further configured to, with the at least one processor, cause the apparatus at least to:
   receive a transmission from the at least one user equipment; and
   detect the resource conflict based, at least partially, on the received transmission.

4. The apparatus of claim 3, wherein determining the group member identifier is based, at least partially, on the received transmission, wherein the received transmission comprises a sidelink control information, wherein the sidelink control information at least one of:
   includes the group member identifier, or
   is associated with a payload, wherein the payload comprises an indication of the group member identifier.

5. The apparatus of claim 1, wherein determining the at least one physical sidelink feedback channel resource is further based, at least partially, on at least one of:

at least one physical sidelink shared channel resource associated with at least one transmission received from the at least one user equipment, a physical layer source identifier included in the at least one received transmission, or a number of physical sidelink feedback channel resources available for multiplexing hybrid automatic repeat request acknowledgement information in a physical sidelink feedback channel transmission.

6. The apparatus of claim 1, wherein the at least one memory and the computer program code are further configured to, with the at least one processor, cause the apparatus at least to:

receive, from the at least one user equipment, information for transmitting the indication of the resource conflict, wherein transmitting the indication is based, at least partially, on the received information.

7. The apparatus of claim 1, wherein the at least one memory and the computer program code are further configured to, with the at least one processor, cause the apparatus at least to:

receive a configuration for transmitting the indication of the resource conflict, wherein transmitting the indication is based, at least partially, on the received configuration.

8. The apparatus of claim 7, wherein the configuration comprises at least one indication of the physical sidelink feedback channel sequence that is configured to indicate at least one of:

a detected resource conflict, a potential resource conflict, a detected resource conflict with respect to a resource associated with a received transmission, or a potential resource conflict with respect to the resource.

9. The apparatus of claim 1, wherein determining the at least one physical sidelink feedback channel resource comprises the at least one memory and the computer program code are configured to, with the at least one processor, cause the apparatus at least to:

map the group member identifier of the at least one user equipment to the at least one physical sidelink feedback channel resource.

10. The apparatus of claim 1, wherein the physical sidelink feedback channel sequence comprises a sequence configured to indicate at least one of:

a detected resource conflict, a potential resource conflict, a detected resource conflict with respect to a resource associated with a received transmission, or a potential resource conflict with respect to the resource.

11. The apparatus of claim 1, wherein the at least one memory and the computer program code are further configured to, with the at least one processor, cause the apparatus at least to at least one of:

receive the group member identifier from another user equipment, or receive an indication of the group member identifier from a group management function of an upper layer.

12. The apparatus of claim 1, wherein transmitting, with the at least one determined physical sidelink feedback channel resource to the at least one user equipment, the indication of the resource conflict comprises the at least one memory and the computer program code are further configured to, with the at least one processor, cause the apparatus at least to at least one of:

transmit the indication with a plurality of determined physical sidelink feedback channel resources, or transmit an indication of a plurality of indications of the resource conflict with a physical sidelink feedback channel resource of the plurality of determined physical sidelink feedback channel resources, wherein the plurality of determined physical sidelink feedback channel resources respectively correspond to a plurality of physical sidelink shared channel resources associated with transmissions of the at least one user equipment.

13. The apparatus of claim 1, wherein transmitting the indication of the resource conflict is based, at least partially, on at least one of:

a priority of the indication of the resource conflict, a priority of sidelink hybrid automatic repeat request feedback corresponding to a transmission received from the at least one user equipment, a type of the determined resource conflict, or a reception status of the received transmission.

14. A method comprising:

determining a group member identifier of at least one user equipment that has performed transmission;

determining at least one physical sidelink feedback channel resource based, at least partially, on the determined group member identifier; and transmitting, with the at least one determined physical sidelink feedback channel resource to the at least one user equipment that has performed transmission, an indication of a resource conflict associated with the at least one user equipment, wherein the indication of the resource conflict comprises a physical sidelink feedback channel sequence.

15. An apparatus comprising:

at least one processor; and at least one non-transitory memory including computer program code;

the at least one memory and the computer program code configured to, with the at least one processor, cause the apparatus at least to:

perform transmission of at least one message;

determine at least one physical sidelink feedback channel resource based, at least partially, on a group member identifier of the apparatus;

monitor the at least one determined physical sidelink feedback channel resource; and receive, based on monitoring of the at least one determined physical sidelink feedback channel resource, an indication of a resource conflict associated with the at least one message, wherein the indication of the resource conflict comprises a physical sidelink feedback channel sequence.

16. The apparatus of claim 15, wherein the at least one message comprises a sidelink control information, wherein the sidelink control information at least one of:

includes the group member identifier, or is associated with a payload, wherein the payload comprises an indication of the group member identifier.

17. The apparatus of claim 15, wherein determining the at least one physical sidelink feedback channel resource is further based, at least partially, on at least one of:

at least one physical sidelink shared channel resource associated with the at least one transmitted message, a physical layer source identifier included in the at least one transmitted message, or a number of physical sidelink feedback channel resources available for multiplexing hybrid automatic repeat request acknowledgement information in a physical sidelink feedback channel transmission.

18. The apparatus of claim 15, wherein the physical sidelink feedback channel sequence comprises a sequence configured to indicate at least one of:

a detected resource conflict,
a potential resource conflict,
a detected resource conflict with respect to a resource associated with the at least one transmitted message, or
a potential resource conflict with respect to the resource.

19. An apparatus comprising:
at least one processor; and
at least one non-transitory memory including computer program code;
the at least one memory and the computer program code configured to, with the at least one processor, cause the apparatus at least to:
  determine a group member identifier of at least one user equipment that has performed transmission;
  determine at least one physical sidelink feedback channel resource based, at least partially, on the determined group member identifier;
  transmit, with the at least one determined physical sidelink feedback channel resource to the at least one user equipment that has performed transmission, an indication of a resource conflict associated with the at least one user equipment; and
  receive a configuration for transmitting the indication of the resource conflict, wherein transmitting the indication is based, at least partially, on the received configuration,
  wherein the configuration comprises at least one indication of a physical sidelink feedback channel sequence configured to indicate at least one of:
    a detected resource conflict,
    a potential resource conflict,
    a detected resource conflict with respect to a resource associated with a received transmission, or
    a potential resource conflict with respect to the resource.

20. An apparatus comprising:
at least one processor; and
at least one non-transitory memory including computer program code;
the at least one memory and the computer program code configured to, with the at least one processor, cause the apparatus at least to:
  determine a group member identifier of at least one user equipment that has performed transmission;
  determine at least one physical sidelink feedback channel resource based, at least partially, on the determined group member identifier; and
  transmit, with the at least one determined physical sidelink feedback channel resource to the at least one user equipment that has performed transmission, an indication of a resource conflict associated with the at least one user equipment, wherein the transmitting of the indication comprises:
    transmitting the indication with a plurality of determined physical sidelink feedback channel resources, or
    transmitting an indication of a plurality of indications of the resource conflict with a physical sidelink feedback channel resource of the plurality of determined physical sidelink feedback channel resources,
  wherein the plurality of determined physical sidelink feedback channel resources respectively correspond to a plurality of physical sidelink shared channel resources associated with transmissions of the at least one user equipment.

* * * * *